US008909948B2

(12) United States Patent
Bansal

(10) Patent No.: US 8,909,948 B2
(45) Date of Patent: Dec. 9, 2014

(54) ON-CHIP POWER MANAGEMENT

(75) Inventor: Nitin Bansal, Haryana (IN)

(73) Assignee: STMicroelectronics International N.V., Amsterdam (NL)

( * ) Notice: Subject to any disclaimer, the term of this patent is extended or adjusted under 35 U.S.C. 154(b) by 283 days.

(21) Appl. No.: 12/592,942

(22) Filed: Dec. 4, 2009

(65) Prior Publication Data
US 2010/0164469 A1 Jul. 1, 2010

(30) Foreign Application Priority Data

Dec. 5, 2008 (IN) .......................... 2771/DEL/2008

(51) Int. Cl.
*H02J 1/00* (2006.01)
*G06F 1/26* (2006.01)
*H02M 1/36* (2007.01)

(52) U.S. Cl.
CPC ... *H02J 1/00* (2013.01); *G06F 1/26* (2013.01); *H02M 1/36* (2013.01)
USPC .......................................... 713/300; 323/318

(58) Field of Classification Search
CPC ............ G06F 1/26; G06F 1/3203; H02J 1/00; H02M 1/36
USPC ....................................................... 713/300
See application file for complete search history.

(56) References Cited

U.S. PATENT DOCUMENTS

| 6,868,500 | B1 * | 3/2005 | Kutz et al. ...................... 713/300 |
| 7,420,791 | B1 * | 9/2008 | Dong et al. ...................... 361/90 |
| 7,492,619 | B2 * | 2/2009 | Ye et al. ........................... 363/97 |
| 2004/0095116 | A1 * | 5/2004 | Kernahan et al. ............. 323/282 |
| 2006/0171175 | A1 * | 8/2006 | Zhu et al. ..................... 363/21.12 |
| 2008/0224749 | A1 * | 9/2008 | Lin et al. ........................ 327/261 |
| 2008/0246509 | A1 * | 10/2008 | Xiao et al. ....................... 326/39 |
| 2009/0026977 | A1 * | 1/2009 | Omi ................................ 315/294 |
| 2009/0044034 | A1 * | 2/2009 | Wong et al. ................... 713/330 |
| 2009/0106609 | A1 * | 4/2009 | Sato ............................... 714/726 |
| 2009/0284289 | A1 * | 11/2009 | Imtiaz ............................ 327/143 |
| 2010/0127679 | A1 * | 5/2010 | Satterfield ...................... 323/282 |

* cited by examiner

*Primary Examiner* — Adolf Berhane
*Assistant Examiner* — Gustavo Rosario Benitez
(74) *Attorney, Agent, or Firm* — Seed IP Law Group PLLC

(57) ABSTRACT

The present disclosure teaches a power management device for providing one or more voltages and prohibiting the operation until the IC is initialized and voltage stability is achieved. The power management device includes a power regulator block and a masking block. The power regulator block includes one or more of the following elements:- a regulator, a bandgap reference generator, a low voltage detector LVDD, a low voltage detector LVDM, and a plurality of logic gates. In one embodiment, the masking block includes one or more level shifters, a plurality of logic gates, a D flip-flop, and a power on reset circuit (PoR).

20 Claims, 3 Drawing Sheets

ON-CHIP POWER MANAGEMENT

CROSS-REFERENCE TO RELATED APPLICATION(S) AND CLAIM OF PRIORITY

The present application is related to Indian Patent Application No. 2771/Del/2008, filed Dec. 5, 2008, entitled "ON-CHIP POWER MANAGEMENT". Indian Patent Application No. 2771/Del/2008 is assigned to the assignee of the present application and is hereby incorporated by reference into the present disclosure as if fully set forth herein. The present application hereby claims priority under 35 U.S.C. §119(a) to Indian Patent Application No. 2771/Del/2008.

TECHNICAL FIELD

The present disclosure relates to power management and, more specifically, to on-chip power management.

BACKGROUND

In semiconductor technology, rapidly shrinking integrated circuit (IC) dimensions drive the requirement of reduced device geometries resulting in the need for multiple voltages to retain compliance with operational constraints. This necessitates the use of on-chip power regulators. In typical applications, the on-chip power regulator derives the supply voltage for the digital core from the input/output (IO) supply voltage. For example, an on-chip regulator generates the 1.2 V supply (for the digital core) from the 3.3 V supply (of the IOs) to save an extra off-chip supply and also to reduce the bill of material (BOM) cost.

In order to facilitate testing, the on-chip regulator is often enabled/disabled by a control signal. This control signal can either be given directly from the IO pad (on the IO ring) or can be driven by the digital core logic itself. However, providing the control signal from the IO ring increases the required number of IO pads resulting in increased cost of packaging.

FIG. 1 illustrates an on-chip control mechanism 100 for on-chip power regulators. The on-chip regulator is controlled by signals which are generated by the digital core. However, since the digital core itself is operating on the Vdd supply generated by the regulator, this may result in unreliable system operation. Further, this approach does not allow the testing of the various sub blocks of the power management unit (PMU).

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
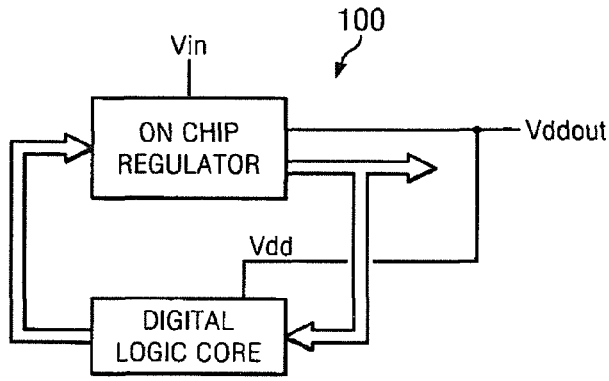
FIG. 1 illustrates a conventional power regulator.

The embodiments of the present disclosure are described in detail with reference to the accompanying drawings. However, the present disclosure is not limited to these embodiments which are only provided to explain more clearly the present disclosure to the ordinarily skilled in the art of the present disclosure. In the accompanying drawings, like reference numerals are used to indicate like components.

The present disclosure teaches a power management device for providing one or more voltages. The power management device prohibits the system's operation until it has been initialized and the supply voltage is stable. The power management device includes a power regulator block capable of being enabled or disabled by one or more control signals generated by the digital logic core and processed in a masking block. The power regulator block includes any one or more of the following elements—voltage regulator, bandgap reference generator, and low voltage detector. The masking block includes a plurality of logic gates, and a power on reset circuit (PoR).

The disclosure also teaches an integrated circuit which includes a power management device for providing one or more voltages. The power management device prohibits the system's operation until it has been initialized and the supply voltage is stable. The power management device includes a power regulator block capable of being enabled or disabled by one or more control signals generated by the digital logic core and processed in a masking block. The power regulator block includes any one or more of the following elements—voltage regulator, bandgap reference generator, and low voltage detector. The masking block includes a plurality of logic gates, and a power on reset circuit (PoR).

The disclosure further teaches a system which includes a power management device for providing one or more voltages. The power management device prohibits the system's operation until it has been initialized and the supply voltage is stable. The power management device includes a power regulator block capable of being enabled or disabled by one or more control signals generated by the digital logic core and processed in a masking block. The power regulator block includes any one or more of the following elements—voltage regulator, bandgap reference generator, and low voltage detector. The masking block includes a plurality of logic gates, and a power on reset circuit (PoR).

The disclosure also teaches a method for providing a stable regulated supply voltage. Initially, the input supply voltage is monitored by the PoR circuit, and the system is initialized for safe startup. Once the input supply voltage and output supply voltage achieve predetermined voltage levels, the power management controls are transferred to the digital logic core. The status of input and output supply voltages are available to the system, and once the voltage levels fall below the predetermined levels, the control is taken back by the power management device.

Figure 2:
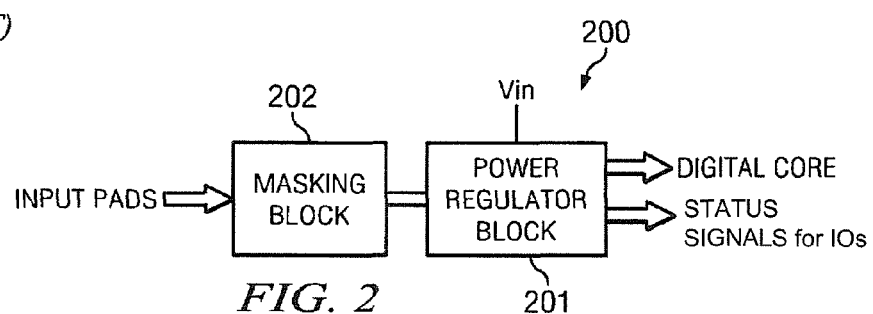
FIG. 2 illustrates a block diagram of a power management device according to an embodiment of the present disclosure.

FIG. 2 illustrates a power management device 200 according to an embodiment of the present disclosure. Power management device 200 includes a power regulator block 201 and a masking block 202. Power regulator block 201 receives an input power supply (IO supply voltage) Vin and provides a regulated power supply voltages at its output terminal for operation of the digital core and also provides various status signals for input and output supplies. Power regulator block 201 is enabled or disabled by one or more control signals received from masking block 202. Masking Block 202 has one or more input terminals for receiving the digital signals from the digital logic core and subsequently provides the control signals to control the power regulator block 201.

Figure 3:
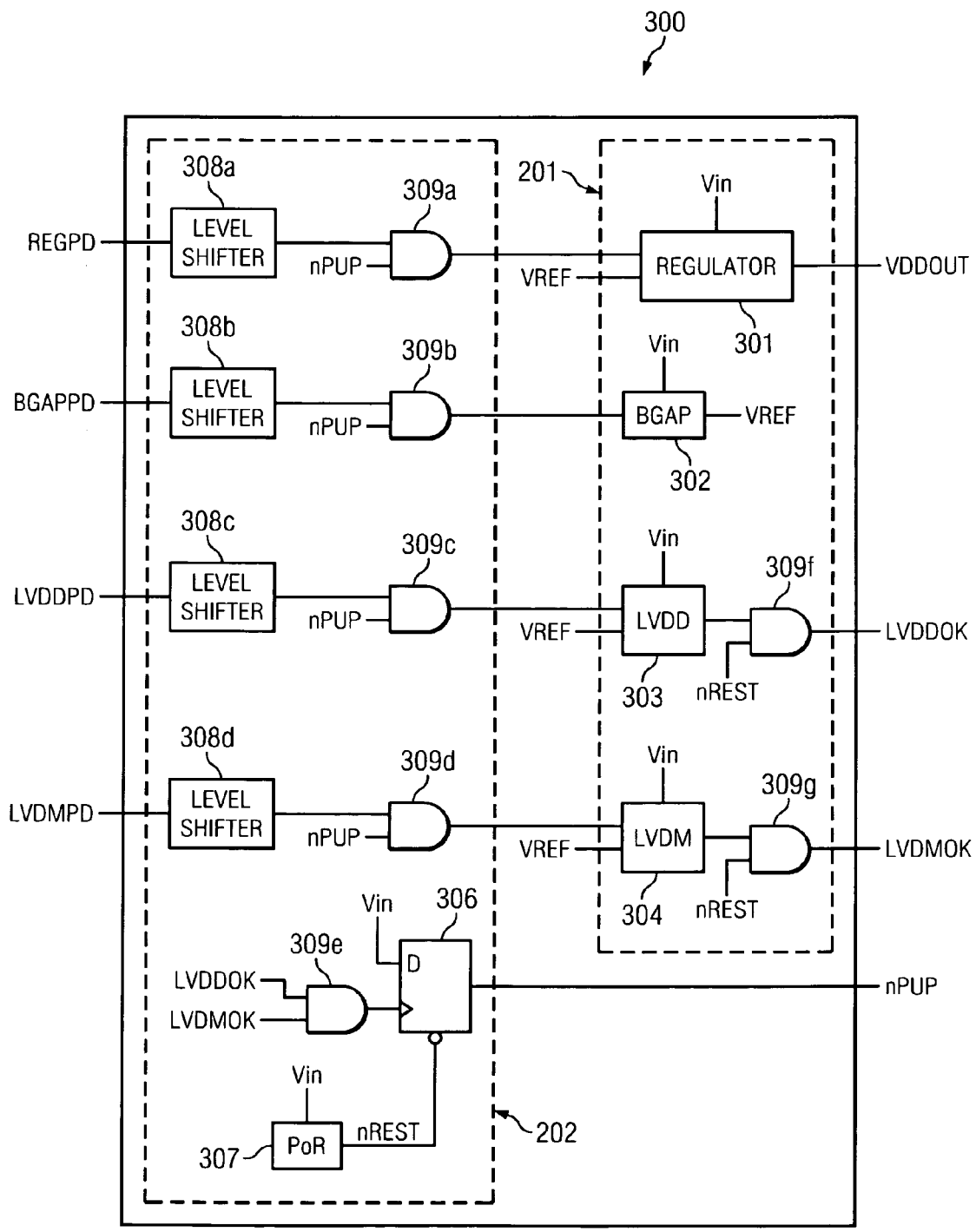
FIG. 3 illustrates a power management device according to an embodiment of the present disclosure.

FIG. 3 illustrates a power management device 300 according to an embodiment of the present disclosure. The power regulator block 201 includes a regulator 301, a bandgap reference generator (BGAP) 302, a first low voltage detector LVDD 303, and a second low voltage detector LVDM 304. Masking block 202 includes a power on reset circuit 307, a plurality of level shifters 308, a plurality of logic gates 309, a delay block 306 and a plurality of logic gates 309. In an embodiment, the delay block 306 is D flip-flop. Regulator (REG) 301 generates the output voltage VDDOUT with desired load current capacity for the operation of the digital core. Bandgap reference generator 302 generates the reference voltage $V_{REF}$ required by regulator 301, and low voltage detectors (LVDs) 303 and 304. Low voltage detector (LVDD) 303 checks whether the digital supply voltage is high enough for the safe operation of the digital logic. Low voltage detector (LVDM) 304 determines whether the IO supply voltage is high enough for the safe operation of the IOs and other analog blocks such as a phase-locked loop (PLL), an analog-to-digital converter (ADC), etc.

Power on reset (PoR) circuit 307 monitors the input voltage $V_{in}$ and generates a reset signal nREST when the input voltage $V_{in}$ achieves the desired level. Power on reset (PoR) circuit 307 is coupled to the D flip-flop 306 for providing an initial reset signal based on the voltage level of the input supply. The initial reset signal nREST is provided for initializing all the nodes of power management block 300. The D flip-flop block 306 generates nPUP signal for initializing the digital logic and the masking block itself.

Low voltage detectors 303, 304 compare a fraction of the voltage level with the reference voltage $V_{REF}$. During the startup phase, there is a possibility that low voltage detectors 303, 304 do not get a reliable reference voltage and thus may give a false OK signal at the outputs. To avoid this problem, the PoR circuit 307 provides the nREST signal which is used to mask the outputs of low voltage detectors 303, 304. PoR circuit 307 is designed in such a way that by the time the nREST signal is released, the bandgap reference voltage $V_{REF}$ is available. The nPUP signal is generated by using the nREST signal and the output signal of low voltage detectors 303, 304. PoR circuit 307 detects the supply level $V_{in}$ and maintains nREST signal to a low state until a predetermined threshold is reached, after which the nREST signal is pulled to a high state and follows the input supply level.

Power management device 300 has features for testing each analog functional section. After the startup, the REGPD signal is forced high. This forces the on-chip regulator into a power down state, and the 1.2 v digital voltage is applied externally to the chip. The threshold voltage for the LVDD 303 is measured by varying the 1.2 v supply externally and measuring the LVDDOK signal logic level. A first current consumption (CC1) of the power regulator block includes the current consumptions of the LVDM, LVDD, BGAP and PoR blocks. The low voltage detector LVDD 303 is powered down by asserting a high LVDDPD signal and determining a second current consumption (CC2). The second current consumption (CC2) is compared with the first current consumption CC1 of the power regulator block for calculating the current consumption of LVDD 303.

The threshold voltage for LVDM 304 is measured by varying the IO supply and checking the LVDMOK signal logic level. Then the low voltage detector LVDM 304 is placed in power down mode for calculating a third current consumption (CC3) of the power regulator block. The third current consumption CC3 is compared with the second current consumption CC2 for calculating the bias current consumption of the LVDM 304.

The bandgap reference generator BGAP 302 is placed in the Power Down mode for measuring a fourth current consumption (CC4) which is the bias current for the PoR circuit 307. The fourth current consumption CC4 is compared the third current consumption CC3 for determining the current consumption of the bandgap reference generator BGAP 302. The IO supply is dropped to lower values such that the nREST/nPUP signal again goes low. Varying the IO supply level in this manner provides the PoR thresholds.

Figure 4:
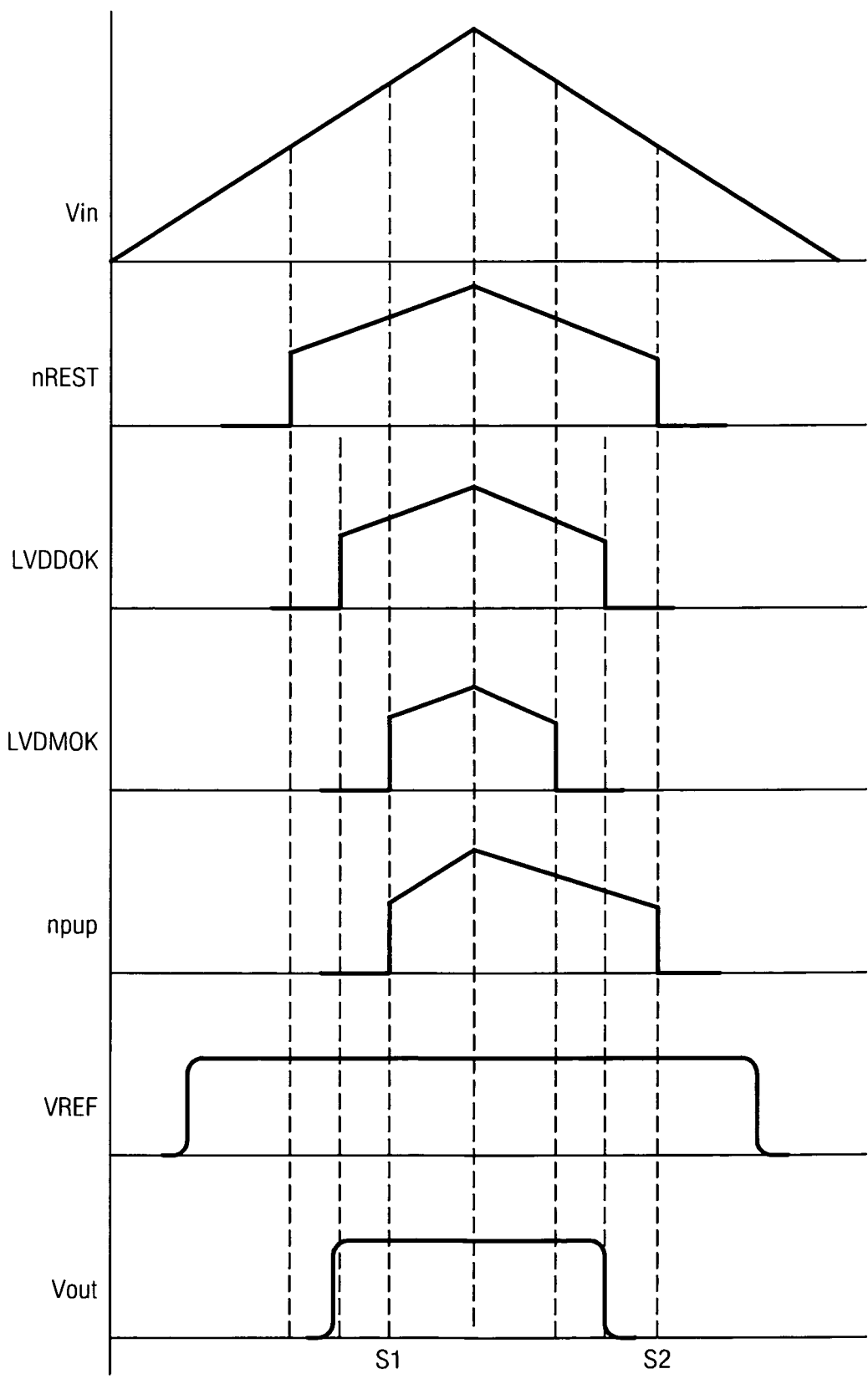
FIG. 4 illustrates the voltage level of signals used in the power management block according to an embodiment of the present disclosure.

FIG. 4 illustrates the voltage level of signals used in the power management block according to an embodiment of the present disclosure. At voltage level S1, the IC is initialized and its operation is activated. The power management controls are transferred to the digital core. At voltage level S2, the startup cycle is initiated. The power management controls are taken back from the digital core. This illustrates that the IC's operation is active between S1 and S2.

Figure 5:
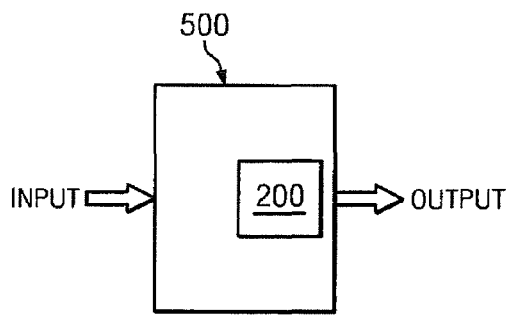
FIG. 5 illustrates a block diagram that discloses an application for a power management device according to an embodiment of the present disclosure.

FIG. 5 illustrates a block diagram that discloses an application for a power management device 200, which provides one or more voltages and prohibits the system's operation until it has been initialized and the supply voltage is stable. System 500 includes the power management device 200 which includes a power regulator block 201 and a masking block 202. One embodiment of system 500 is used in automotive applications for body control.

Figure 6:
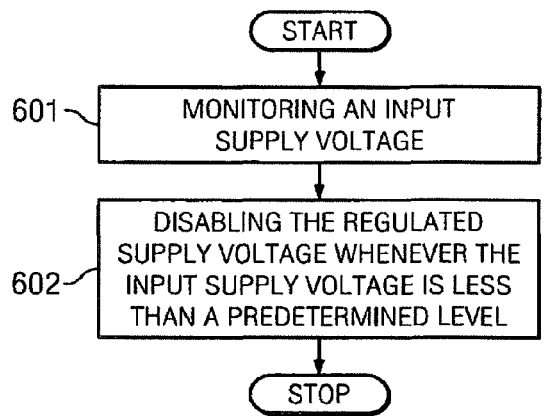
FIG. 6 illustrates a method for providing a stable regulated supply voltage according to an embodiment of the present disclosure.

Embodiments of the method for providing a stable regulated supply voltage are described in FIG. 6. The methods are illustrated as a collection of blocks in a logical flow graph, which represents a sequence of operations that can be implemented in hardware, software, or a combination thereof. The order in which the process is described is not intended to be construed as a limitation, and any number of the described blocks can be combined in any order to implement the process, or an alternate process.

FIG. 6 illustrates the flow diagram of a method for providing a stable regulated supply voltage according to an embodiment of the present disclosure. In step 601, the input supply voltage is monitored by the PoR circuit. Once the input supply voltage and the output supply voltage achieve predetermined voltage levels, the nPUP signal is generated and the power management control is transferred to the digital logic core to ensure safe startup. Subsequently, the status of input and output supply voltages is provided to the system. Power management control is taken back when supplies fall below the predetermined level for safe power down. The predetermined voltage level is based on the system requirements. Thus, the regulated supply voltage is disabled whenever the input supply voltage is less than a predetermined level as depicted in step 602.

The embodiments of the present disclosure, relating to power management device, are used in various applications, such as in microcontroller-based controls. End-use domains include automotive applications for body control and power train. The power management block provides multiple voltages and also prohibits operation until the IC is initialized and voltage stability is achieved. It provides a safe and robust startup mechanism for an integrated circuit. It does not require an external power up signal. The operation of the system does not require any startup delays and is not dependent on time delays as all control transfers incorporate handshaking. The testability of analog blocks improves Design For Test (DFT) coverage of the chip, and debugging is facilitated incase the power management block is not performing as per the specifications. There is no need for external control signals and the cost of extra Pads/pins is avoided. The approach allows the use of a bypass mode to check the chip performance without the regulator by supplying the digital voltage externally.

Although the disclosure of system and method has been described in connection with the embodiment of the present disclosure illustrated in the accompanying drawings, it is not limited thereto. It will be apparent to those skilled in the art that various substitutions, modifications and changes may be made thereto without departing from the scope and spirit of the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system, comprising:
a power management device configured to manage power for a digital logic core and for a plurality of analog blocks, the power management device comprising:
a power regulator block configured to receive an input power supply voltage and to output a regulated power supply voltage, wherein the power regulator block comprises
a power regulator configured to output the regulated power supply voltage for use by the digital logic core,
a first low voltage detector configured to determine whether the input power supply voltage is high enough for operation of the digital logic core and to be disabled by one or more control signals when the input power supply voltage is below a threshold,
a second low voltage detector configured to determine whether the input power supply voltage is high enough for operation of the analog blocks and to be disabled by the one or more control signals when the input power supply voltage is below the threshold,
a bandgap reference generator configured to generate a reference voltage inputted to the power regulator and the first and second low voltage detectors,
wherein the power regulator block is configured to be controlled by signals from the digital logic core once the input power supply voltage achieves a predetermined level following a power on reset and unless the regulated power supply voltage is not high enough for operation of the digital logic core; and
a masking block comprising a power on reset circuit, a plurality of level shifters, a plurality of logic gates and a delay block, wherein the masking block is configured to operate without receiving the regulated power supply voltage and to output the one or more control signals disabling the first and second low voltage detectors when the input power supply voltage is below the threshold.

2. The system of claim 1, wherein the power regulator block receives the input power supply voltage as an input to the power regulator.

3. The system of claim 1, wherein the plurality of logic gates within the masking block are configured to generate at least one of the one or more control signals.

4. The system of claim 1, wherein the first and second low voltage detectors are further configured to be enabled by the one or more control signals when the input power supply voltage is above the threshold, and
wherein the power on reset circuit is configured to monitor the input power supply voltage, to generate a reset signal as one of the one or more control signals and comprising a first state when the input power supply voltage is below the threshold and a second state when the input power supply voltage is above the threshold.

5. The system of claim 1, wherein the power management device is configured to prohibit an operation of the system until the power management device has been initialized and the input power supply voltage is stable.

6. An integrated circuit, comprising:
a power management device configured to manage power for a digital logic core and for a plurality of analog blocks, the power management device comprising:
a power regulator block comprising:
a first input configured to be coupled to an input power supply voltage,
an output configured to provide a regulated power supply voltage,
a power regulator configured to output the regulated power supply voltage on the output for use by the digital logic core,
a first low voltage detector configured to determine whether the input power supply voltage is high enough for operation of the digital logic core, and
a second low voltage detector configured to determine whether the input power supply voltage is high enough for operation of the analog blocks,
a bandgap reference generator configured to generate a reference voltage inputted to the power regulator and the first and second low voltage detectors,
wherein the first and second low voltage detectors are configured to be disabled by one or more control signals when the input power supply voltage is below a threshold, and wherein the power regulator block is configured to be controlled by signals from the digital logic core once the input power supply voltage achieves a predetermined level following a power on reset and unless the regulated power supply voltage is not high enough for operation of the digital logic core; and a masking block comprising an input coupled to the digital logic core, an output coupled to a second input of the power regulator block on which the one or more control signals are received by the power regulator block, a power on reset circuit, a plurality of level shifters, a plurality of logic gates and a delay block, wherein the masking block is configured to provide the one or more control signals disabling the first and second low voltage detectors when the input power voltage supply is below the threshold, and to operate without receiving the regulated power supply voltage.

7. The integrated circuit of claim 6, wherein the power regulator receives the input power supply voltage at an input for the power regulator.

8. The integrated circuit of claim 6, wherein the plurality of logic gates within the masking block are configured to generate at least one of the one or more control signals.

9. The integrated circuit of claim 6, wherein the first and second low voltage detectors are further configured to be enabled by the one or more control signals when the input power supply voltage is above the threshold, and wherein the power on reset circuit is configured to monitor a voltage of the input power supply and to generate a reset signal as one of the one or more control signals and comprising a first state when the voltage of the input power supply is below the threshold and a second state when the voltage of the input power supply is above the threshold.

10. The integrated circuit of claim 6, wherein the power management device is configured to prohibit an operation of the integrated circuit until the power management device has been initialized and a voltage of the input power supply is stable.

11. A power management device configured to manage power for a digital logic core and for a plurality of analog blocks, the power management device comprising:

a power regulator block configured to receive an input power supply voltage, wherein the power regulator block comprises a power regulator configured to output a regulated power supply voltage for use by the digital logic core, a first low voltage detector configured to determine whether the input power supply voltage is high enough for operation of the digital logic core, a second low voltage detector configured to determine whether the input power supply voltage is high enough for operation of the analog blocks, and a bandgap reference generator configured to generate a reference voltage inputted to the power regulator and the first and second low voltage detectors, wherein the first and second low voltage detectors are configured to be disabled by one or more control signals when the input power supply voltage is below a threshold, wherein the power regulator block is configured to be controlled by signals from the digital logic core once the input power supply voltage achieves a predetermined level following a power on reset and unless the regulated power supply voltage is not high enough for operation of the digital logic core; and a masking block comprising a power on reset circuit, a plurality of level shifters, a plurality of logic gates and a delay block, wherein the masking block is configured to output the one or more control signals disabling the first and second low voltage detectors when the input power supply voltage is below the threshold and to operate without receiving the regulated power supply voltage.

12. The power management device of claim 11, wherein the delay block comprises a D flip-flop configured to initialize the digital logic core, wherein an output of the delay block is coupled to inputs of the plurality of logic gates of the masking block, and wherein a clock input to the D flip-flop comprises an output of the power on reset circuit.

13. The power management device of claim 11, wherein the masking block is further configured to receive a first signal generated based on an output of the first low voltage detector and a second signal generated based on an output of the second low voltage detector.

14. The power management device of claim 11, wherein the first and second low voltage detectors are further configured to be enabled by the one or more control signals when the input power supply voltage is above the threshold, and wherein the power on reset circuit is configured to monitor the input power supply voltage and to generate a reset signal as one of the one or more control signals and comprising a first state when the input power supply voltage is below the threshold and a second state when the input power supply voltage is above the threshold.

15. The power management device of claim 11, wherein the masking block is configured to disable the power regulator block to prohibit operation of a system including the power management device until the power management device has been initialized and the input power supply voltage is stable.

16. A method for providing a stable regulated supply voltage using a power management device configured to manage power for a digital logic core and for a plurality of analog blocks, the method comprising:

receiving an input power supply voltage at a power regulator block, wherein the power regulator block comprises a power regulator configured to output a regulated power supply voltage for use by the digital logic core, a first low voltage detector configured to determine whether the input power supply voltage is high enough for operation of the digital logic core, a second low voltage detector configured to determine whether the input power supply voltage is high enough for operation of the analog blocks, and a bandgap reference generator configured to generate a reference voltage inputted to the power regulator and the first and second low voltage detectors, wherein the first and second low voltage detectors are configured to be disabled by one or more control signals when the input power supply voltage is below a threshold, and wherein the power regulator block is configured to be controlled by signals from the digital logic core once the input power supply voltage achieves a predetermined level following a power on reset and unless the regulated power supply voltage is not high enough for operation of the digital logic core; and monitoring the input power supply voltage with a masking block comprising a power on reset circuit, a plurality of level shifters, a plurality of logic gates and a delay block, wherein the masking block outputs the one or more control signals disabling the first and second low voltage detectors when the input power supply voltage is below the threshold and operates without receiving the regulated power supply voltage.

17. The method of claim 16, further comprising:
generating with the power regulator block a first low-voltage detection signal based on an output of the first low voltage detector and the reset signal;
generating with the power regulator block a second low-voltage detection signal based on an output of the second low voltage detector and the reset signal;
generating with the masking block an initialization signal based on the reset signal and based on the first and second detection low-voltage signals; and
generating with the masking block a plurality of control signals based on the initialization signal.

18. The method of claim 17, wherein the output of the first low voltage detector is generated based on the initialization signal, a first low-voltage detection control signal generated by the digital logic core, and a reference voltage, and
wherein the output of the second low voltage detector is generated based on the initialization signal, a second low-voltage detection control signal generated by the digital logic core, and the reference voltage.

19. The method of claim 16, wherein the input power supply voltage is monitored by a power on reset circuit of the masking block configured to generate the reset signal.

20. The method of claim 17, wherein the plurality of control signals are generated based on digital signals received from the digital logic core.

* * * * *